Figure 1:
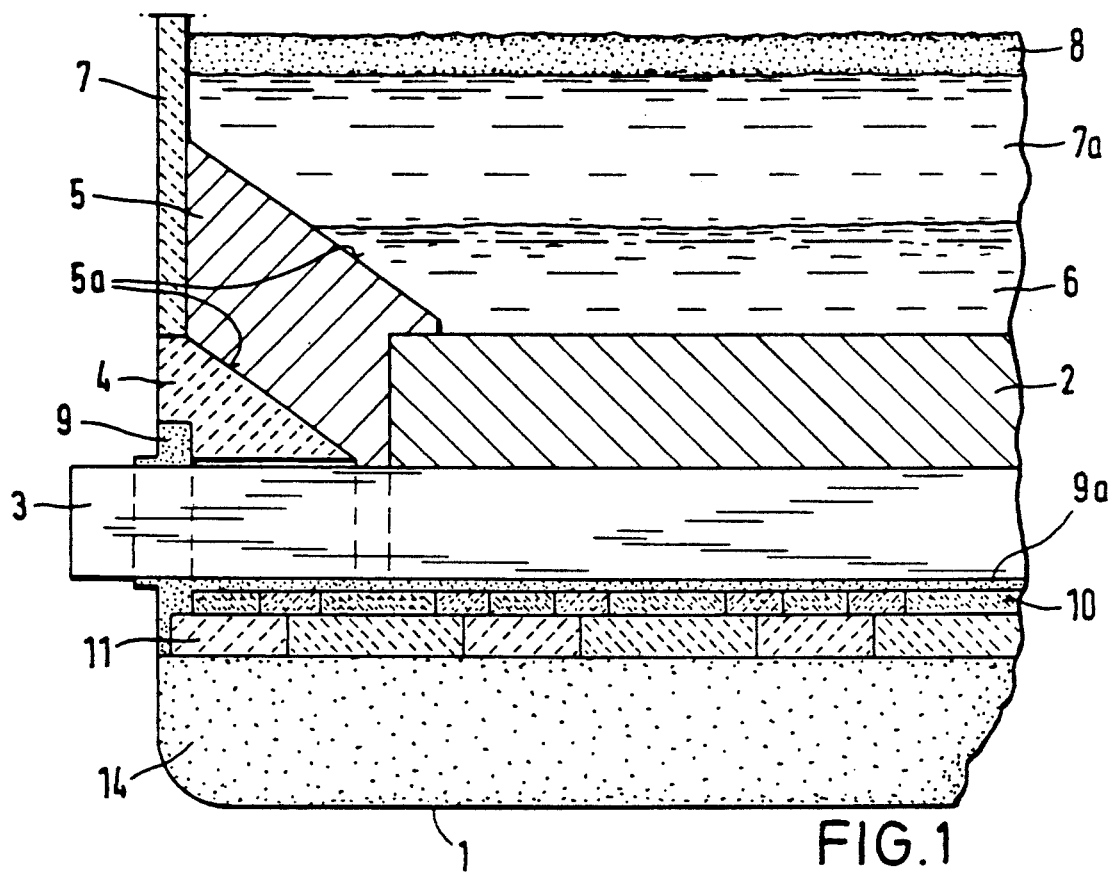

United States Patent [19]

Becker et al.

[11] Patent Number: 5,322,826
[45] Date of Patent: Jun. 21, 1994

[54] REFRACTORY MATERIAL

[75] Inventors: Wolfgang Becker, Dusseldorf; Fred Brunk, Hattingen, both of Fed. Rep. of Germany

[73] Assignee: Dr. C. Otto Feuerfest GmbH, Fed. Rep. of Germany

[21] Appl. No.: 891,445

[22] Filed: May 29, 1992

[30] Foreign Application Priority Data

Jan. 21, 1992 [DE] Fed. Rep. of Germany ....... 4201490

[51] Int. Cl.$^5$ .................. C04B 35/10; C04B 35/46
[52] U.S. Cl. .................................... 501/127; 501/134; 501/153
[58] Field of Search .................. 501/127, 134, 153

[56] References Cited

U.S. PATENT DOCUMENTS

| | | | |
|---|---|---|---|
| 3,267,183 | 8/1966 | Feinleib | 264/30 |
| 3,897,529 | 7/1975 | Carr et al. | 501/153 X |
| 4,430,440 | 2/1984 | Wada et al. | 501/127 X |
| 4,438,214 | 3/1984 | Masuyama | 501/136 |
| 4,542,111 | 9/1985 | Buran et al. | 501/134 X |
| 4,714,640 | 12/1987 | Morgan | 501/127 X |
| 5,039,644 | 8/1991 | Lachman et al. | 501/127 X |
| 5,076,815 | 12/1991 | Kunz et al. | 501/127 X |

FOREIGN PATENT DOCUMENTS

| | | |
|---|---|---|
| 0165754 | 12/1985 | European Pat. Off. |
| 0360564 | 3/1990 | European Pat. Off. |
| 0362186 | 4/1990 | European Pat. Off. |
| 843972 | 7/1952 | Fed. Rep. of Germany |
| 2213906 | 10/1973 | Fed. Rep. of Germany |
| 3116273 | 11/1982 | Fed. Rep. of Germany |
| 3327230 | 2/1985 | Fed. Rep. of Germany |
| 3506200 | 9/1985 | Fed. Rep. of Germany |
| 3521112 | 12/1985 | Fed. Rep. of Germany |
| 3715178 | 11/1988 | Fed. Rep. of Germany |
| 4130917 | 3/1992 | Fed. Rep. of Germany |
| WO83/03106 | 9/1983 | PCT Int'l Appl. |

OTHER PUBLICATIONS

Eric Bright and Dennis W. Readey, "Dissolution Kinetics of $TiO_2$ in HF-HCl Solutions", Dec. 1987, *Journal of the American Ceramic Society*, vol. 70, No. 12, pp. 900–906.

Lawrence H. Edelsonand Andreas M. Glaeser, "Role of Particle Substructure in the Sintering of Monosized Titania", Apr. 1988, *Journal of the American Ceramic Society*, vol. 71, pp. 225–235.

G. Desgardin, I. Mey, B. Raveau, and Jean-Marie Haussonne, "$BaLiF_3$-A New Sintering Agent for $BaTiO_3$-Based Capacitors", *Ceramic Bulletin*, vol. 64, No. 4, 1985, pp. 564–570.

Von G. Routschka, "Feuerfeste Baustoffe fur Roheisentransportgefasse und Roheisenmischer im Spiegel der Literatur", *Keramische Zeitschrift*, 27, Jahrgange, Nr. 10, 1975, pp. 521–528.

*Primary Examiner*—Donald R. Valentine
*Attorney, Agent, or Firm*—Jones & Askew

[57] ABSTRACT

The invention relates to a material which is refractory, porous, resistant to fluorine-containing gases, stable in its volume and heat-insulation, particularly in the form of formed bricks, for a refractory, heat-insulating lining in electrolytic cells, in which metal aluminum is extracted by electrolysis from aluminum oxide dissolved in a fluoride melt; the material has an $Al_2O_3$ content of over 50 wt % and a $TiO_2$ content of 2.5–10 wt % and during the action of fluorine-containing gases at temperatures between 700° and 1000° C. in the area of the material exposed to the fluorine gas, on free surfaces, particularly at the boundary surfaces of intergranular hollow spaces, needle-shaped $TiO_2$ crystals and/or $TiO_2$-containing crystals are formed, growing without regularity into the porous space. The invention furthermore relates to a method for the manufacture as well as the use of the refractory material.

22 Claims, 3 Drawing Sheets

REFRACTORY MATERIAL

The invention relates to a refractory material, particularly for electrolytic cells in which metallic aluminum is extracted by electrolysis from aluminum oxide dissolved in a fluoride melt. The invention also relates to a method for the manufacture and use of the refractory material.

The method for the manufacture of aluminum by smelting-flux electrolysis from aluminum oxide ($Al_2O_3$) dissolved in a fluoride melt is conducted in furnaces that consist essentially of an external steel vat with a heat-insulating lining and a carbon lining. The molten aluminum collects on the carbon lining, above which the fluoride melt is located. These bath components are very aggressive and attempts are therefore made to prevent their reaction by means of a heat-insulating lining. The possible reactions are described, for example, in a book by Morton Sorlie and Harald A. Oye, *Cathodes in Aluminum Electrolysis*, Aluminum-Verlag GmbH Dusseldorf, 1989, pp. 95-99. Essentially, the reactions involve corrosion by the cryolite melt and its gaseous components as well as corrosion by the liquid aluminum melt.

In electrolytic cells for the manufacture of aluminum the entire foundation or a considerable part thereof, is prepared from poured pure aluminum oxide. The weight and particularly the volume of this poured material increases considerably during the course of the operation due to the effect of fluoride-containing gases, with the heat balance changing in particular due top heat losses. The following are the basic requirements for a refractory lining in aluminum electrolytic cells:

1. Resistance against corrosion by liquid aluminum;
2. Resistance against corrosion by cryolite;
3. Barrier effect against fluorine-containing gases;
4. Volume stability;
5. Thermal conductivity on the order of magnitude of conventional chamotte (approximately 1.2-1.8 W/mK);
6. At most, slight changes in the thermal conductivity during the operation of the oven;
7. Content of aluminum oxide of more than 70 wt % in view of subsequent use for the preparation of aluminum.

For a refractory brick lining in the area below the carbon, lining serving as the cathode points 2, 3, 4, 6 and 5 are of crucial importance, in decreasing rank of priority. In terms of recycling the stones, point 7 is also of considerable importance. Resistance against corrosion by liquid aluminum (point 1) is crucial for the melt bath area. Because of the effect of fluorine-containing gases, commercial refractory products exhibit an increase in volume (instability), resulting in relatively rapid wear of the entire oven installation. Usually, the cathodes are bent and the corrosion of the refractory material increases below the cathode and mechanical destruction of the carbon lining occurs.

The poured aluminum oxide material does not meet the above-mentioned requirements, with the exception of point 7.

It is known from U.S. Pat. No. 3,078,173 that to prevent both the penetration of the aluminum melt into the refractory heat-insulating lining and a reaction with the refractory material one can form a refractory heat-insulating lining from a fired ceramic material which contains more than 50 wt % $Al_2O_3$ and 1-30 wt % of an alkaline earth oxide, with the material having no amorphous phase and an apparent porosity of less than 30%. As the $Al_2O_3$ component for the manufacture of the known material, bauxite, with its high $Al_2O_3$ content, can be used. The alkaline earth and $Al_2O_3$ components should be 50% coarser than 150 mesh in their particle size distribution. The effect of the alkaline earth oxide is described as inexplicable. This publication does not mention any influences of fluorine-containing gases.

A proposal is made in German Patent No. 3,116,273 to avoid the penetration of bath components and its associated consequences by providing the heat-insulating lining with a thick volcanic ash layer and a thin leaching barrier made of powdered alumina, between the volcanic ash layer and the carbon lining. This construction is said to be particularly cost effective. The leaching barrier is intended to protect the ash layer but it can only slow down the penetration of the bath components into the ash layer. Accordingly, only the time of use of the oven lining can be evaluated from the thickness of the ash layer, and a thick layer is penetrated only after a correspondingly long time. The publication does not deal with the problem of the effects of the fluorine-containing gases.

According to U.S. Pat. No. 4,175,022 a layer consisting of a graphite layer made of expanded graphite and a steel layer should be used as protection for the refractory lining. The graphite layer is intended to be used as a barrier for sodium, as well as cryolite and its decomposition products; the steel layer should only be impermeable to sodium. In the operation of such a furnace, contact between the fluorine-containing gases and the refractory lining cannot be prevented and the fluorine-containing gases damage this lining, as described above.

An additional known protection against the aluminum melt and particularly against the liquid and gaseous bath components is to provide a layer of calcium silicate and/or calcium aluminate-silicate; these substances are intended to react with the sodium fluoride and produce compounds which are solid at the electrolysis temperatures and do not absorb water (European Patent No. OS 102,361). Since these reactions have slow reaction rates a metal or glass layer is required as well, which is intended to prevent the penetration of the bath components or the aluminum melt into the refractory lining. This protection is not sufficient because, in the case of degradation of the layer, fluorine-containing gases can penetrate further into deeper refractory lining layers.

According to U.S. Pat. No. 4,170,533, one protection consists of a crust made of needle-shaped corundum crystals which have grown into each other and which are possibly adhered to each other by the melt, prepared by cooling an over saturated solution. The preparation of the crust is however such an expensive process that this proposal cannot be used economically.

The purpose of the invention is the preparation of a refractory heat-insulating material for electrolytic cells of the type described above, which is resistant to the corrosion of fluorine-containing gases and which can be manufactured according to a simple and cost-effective method. The purpose of the invention is furthermore to provide a method for the manufacture and a particular use of the material.

This purpose is achieved by the characteristics of claims 1, 23 and 40. Advantageous variants of the invention are characterized in the claims dependent on the former claims.

According to the invention, first a porous, refractory, heat-insulating material is prepared by mixing a granulated, $Al_2O_3$-containing, refractory raw material, particularly aluminosilicates, with an $Al_2O_3$ content of more than 50 wt %, with at least one $TiO_2$-containing raw material and optionally a binder, so that a mass which can be shaped or formed is attained. For example, compositions are prepared consisting of chamotte, corundum, andalusite, bauxite, kyanite, sillimanite or recycled material from oven linings. For example, an electrolytic cell is prepared so that 50–97.5 wt %, preferably 7085 wt % $Al_2O_3$, are present in the dry mass. Rutile, anatase, tialite and/or other titanium compounds are added as the $TiO_2$ raw material in a quantity such that the dry mass contains 2.5–10 wt %, preferably 4–6 wt %, $TiO_2$.

The raw materials that contain $Al_2O_3$ are appropriately prepared for the composition or used with the following particle size distribution:

Particle size: 0–6 mm, preferably 0–4 mm, with a particle size distribution of:

| 0–0.2 mm | 0–55 wt %; | preferably: 20–45 wt % |
|---|---|---|
| 0.2–1 mm | 5–25 wt %; | preferably: 12–20 wt % |
| 1–3 mm | 15–60 wt %; | preferably: 25–35 wt % |
| >3 mm | 0–15 wt %; | preferably: 1–10 wt % |

The raw materials that contain $TiO_2$ are appropriately used with the following particle size distribution:

| 0–0.2 mm | 0–100 wt %; | |
|---|---|---|
| 0.2–1.0 mm | 0–30 wt %; | preferably: 0–15 wt % |
| 1–3.0 mm | 15–45 wt %; | preferably: 25–35 wt % |
| >3.0 mm | 0–15 wt %; | preferably: 1–10 wt % |

As binder it is possible to use kinase, sulfite lyes and phosphates, in each case only as much as needed for the forming.

According to one particular embodiment of the invention, natural aluminosilicate raw materials, which initially have a $TiO_2$ content of >1 wt %, are used. If the contents of $TiO_2$ and/or $Al_2O_3$ are not sufficient, a necessary portion of the component $Al_2O_3$ and/or $TiO_2$ is added. If one of the components is present in too high a concentration, the preparation must be made less concentrated using the other component at the required-amount. A particularly suitable raw material that contains both components initially is bauxite. Accordingly, it is preferable to use refractory or low-iron bauxite.

The prepared composition is shaped, for example, to slake-shaped bricks and the bricks are dried so that a molded blank is formed. Subsequently, the bricks are preferably sintered at temperatures of 1200°–1600° C. The bricks treated in this manner have an apparent porosity of 10–35 vol %.

According to one embodiment of the method according to the invention for the preparation of the refractory heat-insulating material, the bricks are subjected to a treatment, after the fires, with the fluorine-containing gas at temperatures between 700° and 1000° C., particularly between 800° and 900° C., such that the gas also penetrates into the open pores of the brick. The fluorine gas, preferably sodium fluoride, initiates the formation of a great number of whisker-shaped or needle-shaped $TiO_2$ crystals or $TiO_2$-containing crystals that grow in the free pore space or at the boundary surfaces of the intergranular hollow cavities, with no regular orientation; in this way, a relatively dense felt structure made of needle-shaped $TiO_2$ crystals, forms and fills the pore space relatively completely. The crystals consist, for example, of rutile or tialite or other $TiO_2$-containing phases.

Depending on the $TiO_2$ content of the raw material, the duration of action of the fluorine-containing gases and the available pore space, a filling of the pores can be produced that results in a quite-considerable reduction in the gas permeability of the bricks. For example, a refractory brick prior to the treatment has a gas permeability of 42 nperm and after the treatment a gas permeability of 18 nperm. Because of the felt structure in the pore space the penetration of the melt phase is also decreased. Essentially, the crystal pressure of the growing $TiO_2$ crystals is not sufficiently high to break the brick apart. Conventional chamotte brick, without $TiO_2$ addition, under fluorine gas action exhibits a volume expansion on the order of magnitude of approximately 1–4 vol %, with growth in the mullite crystals in the binder matrix causing the particles embedded in the melt to be shifted away from each other. According to the invention the brick, in contrast, does not undergo any noticeable volume expansion; instead its form remains stable. In addition, the brick rigidity is increased and, in spite of the increase in density, good heat-insulating properties are maintained.

It was noted that the brick structure absorbs approximately 1.3 wt % of the fluorine and approximately 0.7 wt % of the sodium. The components of the brick that are responsible for this uptake have not been determined as of yet. Sodium feldspar representatives or calcium fluoride, compounds which usually form, could not be detected.

The $TiO_2$ crystals form not only in the interior of the brick structure, but also on the exterior surface of the brick.

It is appropriate to conduct the fluorine treatment during the firing cycle of the bricks, for example, during the cooling phase. The effect of $TiO_2$ needle formation is then the same.

According to one particular embodiment of the invention the fluorine treatment is conducted in situ, that is, in the state of bricks fired without fluorine gas action built into the oven. The fluorine-containing gas, originating from the cryolite melt, is used and allowed to penetrate into the bricks so that $TiO_2$ formation occurs. In this manner the invention shows another pathway, in comparison to the state of the art, to achieve fluorine gas continuity, i.e., by using a brick with high porosity without protection against the gas and whose properties can be set as desired during the normal operation of the oven; in this way, the properties are maintained, with no loss of the good heat insulation and without destruction of the lining, even when, for example, expansion of the bricks occurs.

The bricks without fluorine treatment are built in as heat-insulating lining components, for example, as in the usual case. During the start-up of the oven they first behave like refractory, heat-insulating bricks according to the state of the art. As soon as the fluorine gas reaches the lining with the refractory, heat-insulating material according to the invention, it can and should act on the material and form the $TiO_2$ felt on all of the free surfaces in the neighborhood of the material reached by the fluorine-containing gas. The felt decreases the gas permeability by increasing the impermeability and, surprisingly, it leads to making the refractory material inert so that the fluorine-containing gases no longer have any damaging effect.

The refractory, heat-insulating material according to the invention can be recycled without any problem, either by addition to the electrolysis process or during the manufacture of new refractory, heat-insulating material, according to the invention. Because the recycled material has absorbed fluorine, this material is particularly well suited for the manufacture of new bricks because during the firing the fluorine, in gaseous form, escapes, is captured and again used for contact with the $TiO_2$-containing $Al_2O_3$ material; in this way, needle formation with the appropriate fluorine composition can be achieved. The fluorine in this process, as indicated above, is bound again, so that the fluorine gas, to the extent that it is circulated, remains harmless and its residual heat can be even used for the formation of the felt. This procedural method decreases the cost of exhaust-gas purification and also the cost of heat generation because of heat recovery. $TiO_2$ is also not lost in this process because it is used again in the new composition and to the extent that it is also circulated.

According to the invention, refractory heat-insulating bricks have preferably an untreated density between 1.5 and 2.9 g/cm$^3$ and a pressure resistance between 5 and 120 MPa; the pressure resistance increases with the untreated density. The thermal-conductivity is between 0.8 W/mK and 3.0 W/mK and the gas permeability is between 2 and 100 nperm, preferably at 50 nperm most. The gas permeability can also be influenced, for example, by the selection of the particle size distribution.

The use of $TiO_2$-containing bauxite for the manufacture of formed and fired refractory bricks for vessels, in which secondary melting processes can be conducted and in which they can also come in contact with cryolite, is known (U.S. Pat. No. 3,078,173). In this process bauxite is reacted with an alkaline earth oxide or an alkaline earth compound. $TiO_2$ is considered a contaminant (U.S. Patent, column 3, lines 70-74). In this known use of bauxite, in spite of the contact with cryolite, the material according to the invention is not formed. Bauxite in combination with an alkaline earth oxide or alkaline earth compound or another reaction partner reacts with fluorine-containing gases and forms the phases described in European Patent No. 05,102,361. The $TiO_2$ felt, according to the invention, is not produced in this process. The formation of the felt is apparently destroyed by the other additions to the bauxite.

The refractory material according to the invention can, as described, be used as a molded brick. It can also be used, with the same efficacy, in the form of a granulate, particularly, however, in the form of a powder; these products are appropriately not treated prior to use with fluorine-containing gas; the treatment then occurs in situ.

During the action of the fluorine-containing gases the $TiO_2$ content of the matrix-substance decreases; this process can go so far that the matrix substance becomes nearly free of $TiO_2$.

Figure 2A:
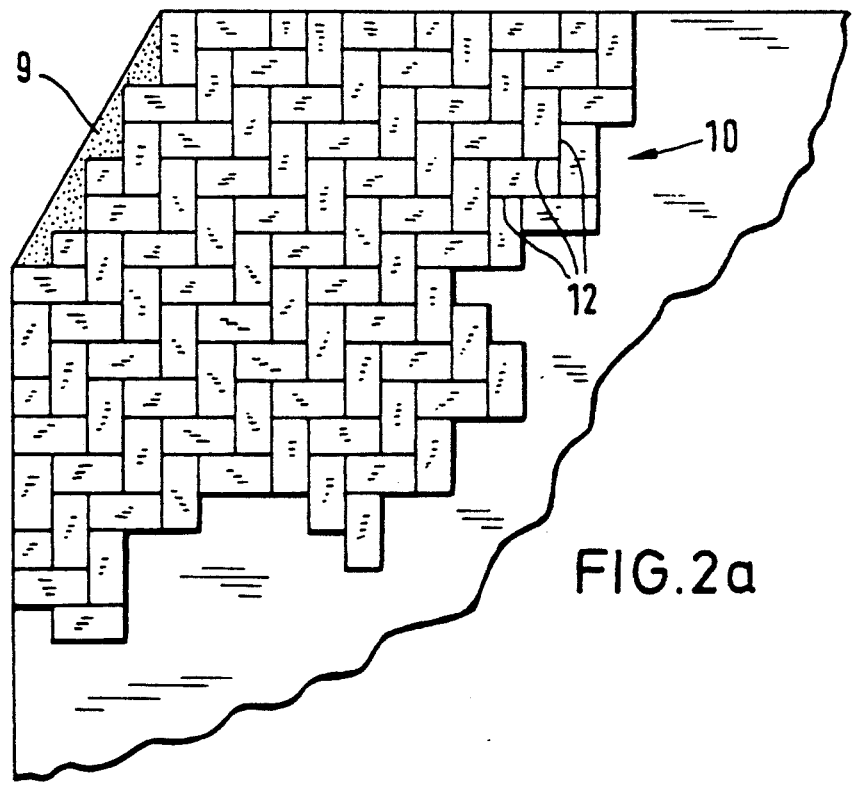
Figure 2B:
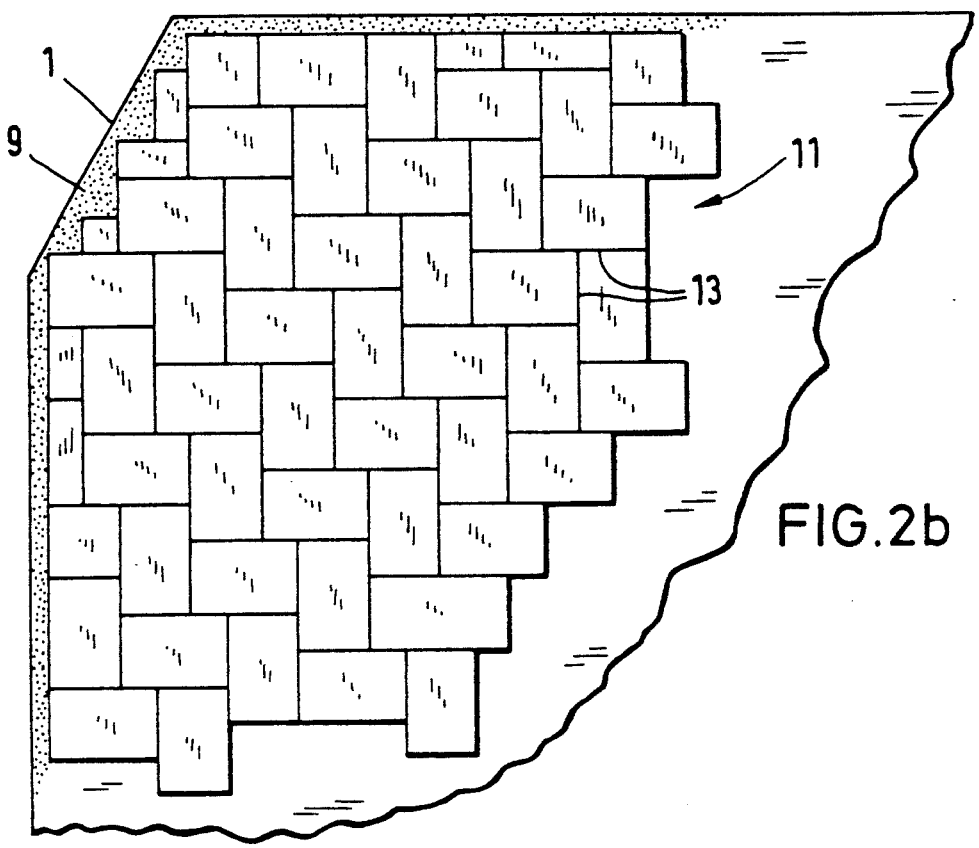
Figure 2C:
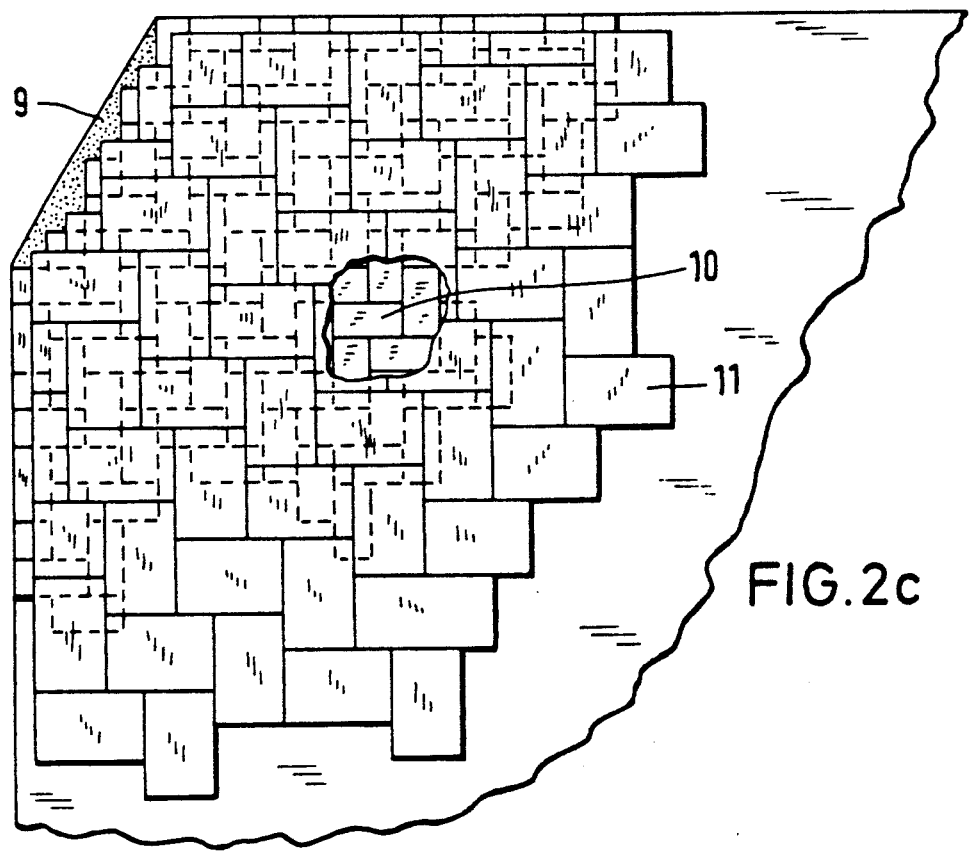
Figure 3:

An appropriate construction of an electrolytic cell is represented diagrammatically in the drawing. The figures show:

FIG. 1: a diagrammatic partial cross section through an electrolytic cell;

FIG. 2a: a diagrammatic top view of the structure of a cryolite barrier layer;

FIG. 2b: a diagrammatic top view of the structure of a fluorine-gas barrier layer made out of bricks according to the invention;

FIG. 2c: a diagrammatic representation of the layers according to FIGS. 2a and 2b stacked on top of each other, in a view from the bottom;

FIG. 3: a scanning electron beam image of a pore in the material according to the invention.

The electrolytic cell illustrated for the manufacture of aluminum is composed of steel vat (1), in which cathodes (2) are arranged as usual, and which is contacted with cathode iron (3) for the power supply; cathode iron (3) passes through a molded brick ring (4) and the cladding of the steel vat (1). Molded brick ring (4) surrounds cathodes (2) at the margin, with a clearance remaining between cathodes (2) and formed brick ring (4), which is filled with a carbon composition (5). Between carbon composition (5) and the steel vat cladding, SiC plates (7) are arranged up to the vat opening. The upper part of the steel vat, as well as its arrangement, are not represented; they correspond to conventional structures. The formed bricks of formed brick ring (4) have a sloped surface (5a) which descends with respect to cathodes (2); said sloped surface is also present in the same manner in the carbon composition (5), so that the lining, which comes into direct contact with aluminum melt (6) and cryolite melt (7a), consists of cathodes (2), carbon composition (5) and the SiC plate (7). In addition, the cryolite melt (7a) can be covered with an $Al_2O_3$ powder layer (8).

In perforation (9) of a formed brick of formed brick ring (4), remaining clearances are appropriately sealed with $Al_2O_3$ containing refractory powder, containing between 18–48 wt % $Al_2O_3$ in its composition.

Immediately below cathodes (2) there is a compensating layer (9a) made of refractory powder, containing approximately 18–48 wt % $Al_2O_3$ in its composition. Under this compensating layer (9a) there is a brick layer (10) made of refractory bricks, containing 18–48 wt % $Al_2O_3$ and exhibiting resistance against the cryolite melt. Under this layer (10) a brick layer (11) is provided, consisting of the refractory, heat-insulating material according to the invention and functioning as a fluorine-gas barrier. It is appropriate to provide another $Al_2O_3$ powder layer (14) below layer (11). The structure of the electrolytic cell illustrated is more resistant, particularly because of the use of the bricks according to the invention, than conventional constructions. In addition, there is the advantage, if the brick's format of layers (10) and (11) are selected in an appropriate manner with respect to each other, of an optimally overlapping cover. The longitudinal measurement of the brick format of layer (11) should be 1.5 times the length of the brick format of layer (10); the width of the brick format of layer (11) should be two times the width of the brick format of layer (10) and the thickness of the brick format of layer (11) should be more than one time the thickness of the brick format of layer (10). For example, for layer (10), a format with the following dimensions was used:

| | | |
|---|---|---|
| Length 200 mm or | Width 100 mm | Thickness 40 mm |
| Length 100 mm | Width 100 mm | Thickness 40 mm. |

The correspondingly selected formats of layer (11) are appropriately:

| Length 300 mm or | Width 200 mm | Thickness 64 mm |
| Length 200 mm or | Width 100 mm | Thickness 64 mm |
| Length 100 mm | Width 100 mm | Thickness 64 mm. |

In this regard, layer (10) always contains the next smaller size of brick format. The bricks are, as illustrated, arranged according to a Z pattern so that the bricks of layer (11)—as can be seen from FIG. 2c—cover nearly completely the interstices (12) of layer (10). Interstices (13) of layer (11) only cross interstices (12) of layer (10), therefore there are no interstices which go all the way through.

On the basis of the following examples the invention is explained in greater detail, with, in particular, indications of mixtures for the manufacture of refractory, heat-insulating bricks according to the invention.

| Example 1 | | | |
|---|---|---|---|
| Bauxite | >3 mm | 10 wt % | |
| Bauxite | 1–3 mm | 25 wt % | |
| Bauxite | 0.2–1 mm | 15 wt % | |
| Bauxite | 0–0.2 mm | 41 wt % | |
| $TiO_2$ | 0–0.2 mm | 1.5 wt % | (anatase) |
| Binder clay | | 7.5 wt % | |
| Example 2 | | | |
| Chamotte | >3 mm | 15 wt % | |
| Chamotte | 1–3 mm | 8 wt % | |
| Chamotte | 0.2–1 mm | 10 wt % | |
| Chamotte | 0–0.2 mm | 20 wt % | |
| Andalusite | 0.2–1 mm | 10 wt % | |
| Bauxite | 0–0.2 mm | 25 wt % | |
| $TiO_2$ | 0–0.2 mm | 4.5 wt % | (anatase) |
| Binder clay | | 7.5 wt % | |
| Example 3 | | | |
| Bauxite | ≧3 mm | 10 wt % | |
| Bauxite | 1–3 mm | 25 wt % | |
| Bauxite | 0.2–1 mm | 15 wt % | |
| Bauxite | 0–0.2 mm | 42 wt % | |
| $TiO_2$ | 0–0.2 mm | 0.5 wt % | (anatase) |
| Binder clay | | 7.5 wt % | |
| Example 4 | | | |
| Corundum | ≧3 mm | 5 wt % | |
| Corundum | 1–3 mm | 42.4 wt % | |
| Corundum | 0.2–1 mm | 15 wt % | |
| Corundum | 0–0.2 mm | 20 wt % | |
| $TiO_2$ | 0–0.2 mm | 2.6 wt % | (anatase) |
| Alumina | 0–0.2 mm | 15 wt % | |

Mixing the raw material components with the addition of 3.0 wt % water as well as 1.0 wt % of an organic binder is performed in a powerful mixer. It is appropriate to add TiO2 as the last raw material component in the mixing process. The total mixing time was approximately 20 min.

The preparation mixtures were formed to bricks at a pressure of approximately 50–60 MPa. The target green bulk densities for Example 1 were, for example, approximately 2.68 g/cm³ for Example 1, and approximately 2.57 g/cm³ for Example 2. After drying (hot air) at 110° C. until the weight was constant, the bricks were fired for approximately 2 h at 1400° C., with a heating and cooling rate of approximately 35° C./h.

The chemicophysical technological properties of the fired bricks are as follows:

| Characteristic | Example 1 | Example 2 | Example 3 | Example 4 |
|---|---|---|---|---|
| Bulk density (g/cm³) | 2.55 | 2.41 | 2.56 | 3.14 |
| (Open) porosity, vol % (*) | 24.8 | 20.1 | 23.2 | 20.3 |
| CPR (MPa) (**) | 28 | 32 | 32 | 34 |
| Gas permeability (nperm) (***) | 42 | 28 | 34 | 8 |
| $Al_2O_3$ (wt %) | 78.2 | 52.1 | 80.4 | 97.2 |
| $TiO_2$ (wt %) | 4.5 | 5.3 | 3.6 | 2.6 |

(*) Water saturation in a vaccuum
(**) CPR = cold pressure resistance
(***) According to DIN 51058

Material samples were exposed to fluorine-containing gas (test conditions: "Fluoride Gas Resistance-Alilab/-Sintef Method").

After the treatment the following weight and volume changes, as well as the gas permeability and pressure resistances, were determined for the brick specimens at room temperature:

| Example 1: | Increase in weight = | 2.1 wt % |
|---|---|---|
| | Increase in volume = | 0.00 vol % |
| | Gas permeability = | 18 nperm |
| | Cold pressure resistance = | 35 MPa |
| | Open porosity = | 22.5 vol % |
| Example 2: | Increase in weight = | 2.4 wt % |
| | Increase in volume = | 0.06 vol % |
| | Gas permeability = | 12 nperm |
| | Cold pressure resistance = | 38 MPa |
| | Open porosity = | 18 vol % |
| Example 3: | Increase in weight = | 1.7 wt % |
| | Increase in volume = | +0.07 vol % |
| | Gas permeability = | 18 nperm |
| | CPR = | 44 MPa |
| | Open porosity = | 21.5 vol % |
| Example 4: | Increase in weight = | 1.2 wt % |
| | Increase in volume = | +0.09 vol % |
| | Gas permeability = | 4 nperm |
| | CPR = | 42 MPa |
| | Open porosity = | 19.1 vol % |

To clarify the structure of the crystal felt in the material according to the invention, which is refractory and heat-insulating, and the resistance against fluorine-containing gases at the temperatures indicated, FIG. 3 provides a view, in the form of a photographic representation, of a pore at 6500× magnification. The illustration shows that $TiO_2$ crystals (white needles) have grown in the free pore space and how this growth took place. The reason why this structure imparts fluorine gas resistance remains unknown to this day.

We claim:

1. Material which is refractory, porous, resistant to fluorine-containing gases, stable in its volume and heat-insulation, particularly in the form of formed bricks, for a refractory, heat-insulating lining in electrolytic cells, in which electrolysis is used to extract metallic aluminum from aluminum oxide dissolved in a fluoride melt, characterized in that the material contains at least 50 wt % $Al_2O_3$ and 2.5–10 wt % $TiO_2$; and that during the action of fluorine-containing gases at temperatures between 700° and 1000° C. in the area of the material exposed to fluorine on free surfaces of the material, particularly the boundary substances of intergranular hollow spaces, needle-shaped $TiO_2$ crystals and/or $TiO_2$-containing crystals form and grow without regularity, into porous space of the material.

2. Material according to claim 1, characterized in that the $Al_2O_3$ content is 50–97.5 wt %.

3. Material according to claim 2, characterized in that the Al$_2$O$_3$ content is 70–85 wt %.

4. Material according to claim 1, characterized in that the TiO$_2$ content is 4–6 wt %.

5. Material according to claim 1, characterized in that the material is fired like a ceramic.

6. Material according to claim 5, characterized in that the material is sintered like a ceramic.

7. Material according to claim 1, characterized in that the bricks formed from the material have a porosity of 10–35 vol %.

8. Material according to claim 7, characterized in that the bricks formed from the material have a porosity of 15–30 vol %.

9. Material according to claim 1, characterized in that the bricks formed from the material have a pressure resistance of 5–120 MPa.

10. Material according to claim 9, characterized in that the bricks formed from the material have a pressure resistance of 10–60 MPa.

11. Material according to claim 1, characterized in that the bricks formed from the material have a thermal conductivity of 0.8–3.0 W/mK.

12. Material according to claim 11, characterized in that the bricks formed from the material have a thermal conductivity of 1.1–2.2 W/mK.

13. Material according to claim 1, characterized in that the bricks formed from the material have a gas permeability of 2–100 nperm.

14. Material according to claim 13, characterized in that the bricks manufactured from the material have a gas permeability of 10–50 nperm.

15. Material according to claim 1, characterized in that TiO$_2$ crystals or TiO$_2$-containing crystals are present in the porous space and grow out of the material, form interlinked felts and are optionally bound by a melt phase to each other.

16. Material according to claim 15, characterized in that the felt crystals fill the porous space of a pore nearly completely, so that, for example, there is a decrease in the gas permeability of approximately 30–60%, with some maintenance of open porosity.

17. Material according to claim 15, characterized in that at least partial areas of the brick are sealed with felt TiO$_2$ crystals and/or TiO$_2$-containing crystals.

18. Material according to claim 15, characterized in that the crystals are rutile crystals.

19. Material according to claim 15, characterized in that the crystals are tialite crystals.

20. Material according to claim 15, characterized in that crystals of rutile, tialite and/or other TiO$_2$-containing crystalline phases are present.

21. Material according to claim 15, characterized in that a brick matrix which surrounds the pores filled with felt crystals has low TiO$_2$ content.

22. Material according to claim 15, characterized in that the matrix material of the bricks around the pores is free of TiO$_2$.

* * * * *